United States Patent [19]

Blunt

[11] 4,392,766
[45] Jul. 12, 1983

[54] AUTOMATIC FEEDING APPARATUS

[75] Inventor: Thomas O. Blunt, Louisville, Ky.

[73] Assignee: General Electric Company, Louisville, Ky.

[21] Appl. No.: 304,223

[22] Filed: Sep. 21, 1981

[51] Int. Cl.³ .................. B65G 59/04; B65H 3/16
[52] U.S. Cl. .................. 414/113; 271/18.1;
271/107; 414/121; 414/122
[58] Field of Search ............... 414/120, 121, 122, 113;
271/18.1, 18.2, 107

[56] References Cited

U.S. PATENT DOCUMENTS

| | | | |
|---|---|---|---|
| 1,511,601 | 10/1924 | Free | 271/107 X |
| 1,716,602 | 9/1927 | Ross . | |
| 2,541,985 | 12/1946 | Chatterton | 271/44 |
| 2,847,212 | 9/1954 | Stem | 271/18 |
| 2,860,874 | 6/1955 | Gulick | 271/10 |
| 2,881,929 | 11/1956 | Giffen | 214/1 |
| 2,973,959 | 10/1958 | Stolk | 271/18 |
| 2,999,687 | 12/1958 | Hommel | 271/18 |
| 3,353,822 | 12/1965 | Dangelmaier et al. | 271/18 |
| 4,024,963 | 5/1977 | Hautau | 214/6 BA |
| 4,197,772 | 5/1980 | Anderson et al. | 83/63 |
| 4,206,465 | 6/1980 | Tamoto et al. | 271/107 X |

FOREIGN PATENT DOCUMENTS 136253 6/1979 Fed. Rep. of Germany ...... 414/121

Primary Examiner—Robert J. Spar
Assistant Examiner—Janice Krizek
Attorney, Agent, or Firm—Frederick P. Weidner; Radford M. Reams

[57] ABSTRACT

Automatic feeding apparatus for transferring work pieces to a work station including a robot having a work arm pivoted about a point and movable through a segment of a sphere with vertical movement of the work arm scribing an arc relative to the pivot point. The robot work arm has means to pick up, hold and release a work piece. A work piece stacking assembly is provided and includes a base for holding a vertical stack of magnetizable work pieces and a vertical butt plate above the base curved correspondingly to the arc scribed by the vertical movement of the work arm of the robot. A magnet is provided to magnetize the work pieces through the vertical curve butt plate to set up a repelling force between the work pieces to vertically separate the work pieces in the upper portion of the stack and urge the separated work pieces against the vertical curve butt plate. A work station is provided for receiving the work piece and it is located within the sphere segment through which the work piece pick-up arm of the robot is movable.

6 Claims, 8 Drawing Figures

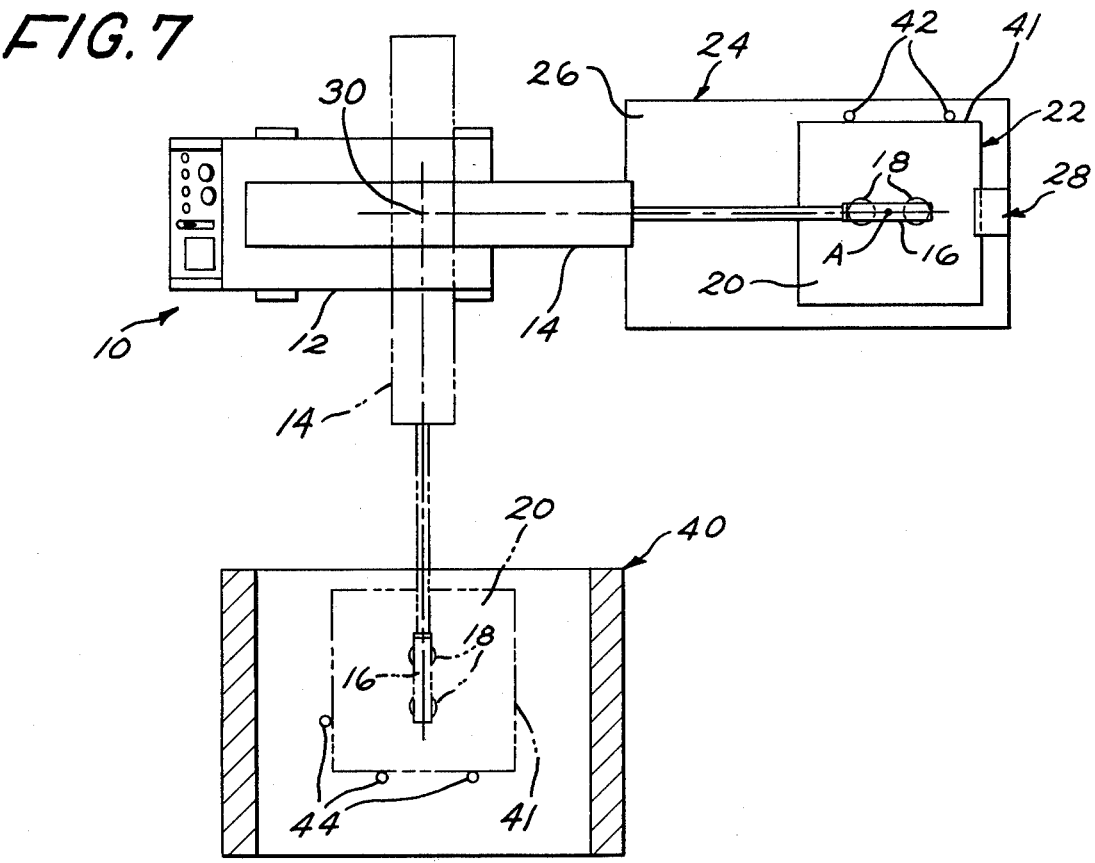
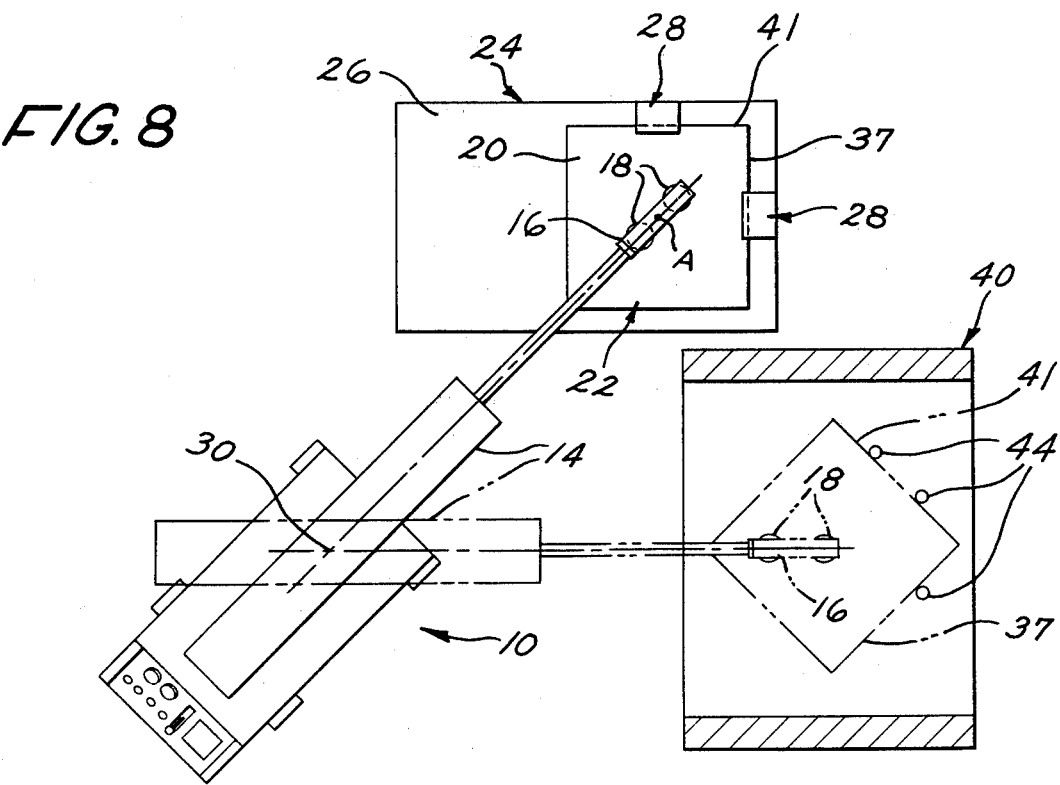

AUTOMATIC FEEDING APPARATUS

BACKGROUND OF THE INVENTION

This invention relates to automatic feeding apparatus for transferring work pieces to a work station.

In the operation of presses, the transfer of blank stock or work pieces from a supply point to the collect for holding the work piece has been for years accomplished by a manual transfer. The speed of operation of the press was thereby limited by the manual dexterity and speed of the operator placing and removing the work pieces from the press. In addition, the requirement for an operator to be in attendance at each press meant a significant labor expense attendant upon the operation of the press.

In addition to the limited speed of operation and the labor involved, the manual operation of such a press also invariably involved a safety factor. An operator transferring work pieces to and from the collect at the work station was required to physically grasp the work pieces and coordinate the operating cycle of the press with his manual movements such that there was a smooth flow of work pieces to and from the work station. Operators of machine tools of this type, despite efforts to observe safety practices, were inevitably faced with situations in which the operator reached into the work area of the press during its operation and on occasion experienced injuries when their hands, arms, or articles of clothing were caught or entangled in the press. In addition, the manual operation of such a press or other type of machinery was typically quite monotonous, tending to lull the operator and tire him quickly. In such an event, the efficiency of the operation of the press declined and safe operation was significantly reduced.

To remedy the foregoing, automatic feeding apparatus or industrial robots for transferring large numbers of pairs on a one-by-one basis from a supply position to a work station of a machine tool or press and for removing parts which have been finished at the work station have been utilized. The use of industrial robots for automatically feeding the press allows operation of the press to be continuous and fully automatic without the need or requirement of attendance of an operator thereby enabling one operator to be responsible for and to adequately supervise the operation of a plurality of such presses. The movement of the industrial robot working arm to supply work pieces to the press is electronically synchronized with the press so that the operation of both pieces of apparatus cooperate with each other.

In the typical operation of a press, a die set is chosen for operating on a part of a specific size and for producing cut-outs of a specific configuration. A plurality of blank stock or work pieces are stacked preparatory to feeding the work pieces into the press by the robot. The work pieces are lifted off the stack individually by the pick-up arm of the robot and transferred to the press collet where the work piece is deposited and held during the operation of the press. Upon completion of one full cycle of press operation, the collet releases and the finished part is transferred to storage.

It has been common practice wherein a plurality of metal blank stock or work pieces are stacked to provide for the uppermost work pieces to be levitated as by magnetism. In known devices of this type, the magnets are arranged so as to prevent the work pieces at the top of the stack from sticking together due to the presence of lubricant or burr thereon. The levitating or fanning effect of the blanks is due to the fact that two ferromagnetic bodies such as the work pieces in a magnetic field will repel each other. The use of magnets to levitate the magnetizable work pieces in the stack is disclosed in prior art references such as U.S. Pat. Nos. 1,716,602, 2,847,212, 3,353,822 and 4,024,963.

One of the difficulties in using an industrial robot for transferring work pieces from a stack to the press is that the precise location of the pick-up point of the work piece from the stack by the robot arm varies as the height of the stack changes. When the work piece is placed in the press, it is necessary that it be placed in the press always at the exact desired position therefore the pick-up point of the work piece from the stack must always be exact and not vary.

By this invention, there is provided automatic feeding apparatus for transferring magnetizable work pieces to a work station automatically as by a robot and which provides for the correct pick-up point by the robot of the work piece and its subsequent disposition in the press.

SUMMARY OF THE INVENTION

According to one aspect of this invention, there is provided automatic feeding apparatus for transferring magnetizable work pieces to a work station. The apparatus includes a robot having a work arm pivoted about a point and having a work piece pick-up end movable through a segment of a sphere with vertical movement of the work arm scribing an arc relative to the pivot point, said work arm having means to pick-up, hold and release a work piece. There is also included a work piece stacking assembly having a base for holding a vertical stack of magetizable work pieces and a vertical butt plate above the base and curved correspondingly to the arc scribed by the vertical movement of the work arm of the robot. Magnet means are provided to magnetize the work pieces through the vertical curved butt plate to set up a repelling force between the work pieces to vertically separate the work pieces in the upper portion of the stack and urge the separated work pieces against the vertical curved butt plate. There is also provided a work station for receiving the work piece and is located within the sphere segment through which the work piece pick-up arm end of the robot is movable.

BRIEF DESCRIPTION OF THE DRAWING

FIG. 7 is a top plan view of the automatic feeding apparatus showing one arrangement of the components of the present invention.

FIG. 8 is a top plan view of another arrangement of the automatic feeding apparatus components of the present invention.

DESCRIPTION OF THE PREFERRED EMBODIMENT

Figure 1:
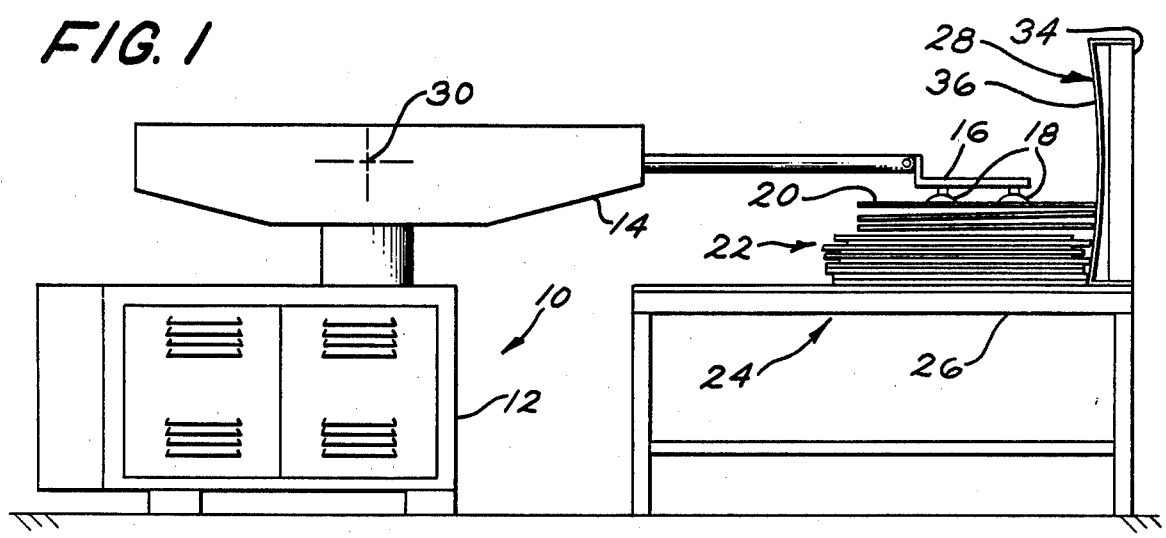
FIG. 1 is a side elevational view of a portion of one embodiment of the automatic feeding apparatus of the present invention.

With particular reference to the FIGS. 1-4, the automatic feeding apparatus of this invention includes a robot 10 having a control console 12 which is programmable to control the operation of the work arm 14. The work arm 14 has a work piece pick-up end 16 with vacuum suction cups 18 for pick up, holding and releasing a work piece 20 from a stack 22 of work pieces. The stack 22 is located on a work piece stacking assembly 24 which includes a base 26 for holding the vertical stack of work pieces 20 and a butt plate 28 above the base.

Figure 2:
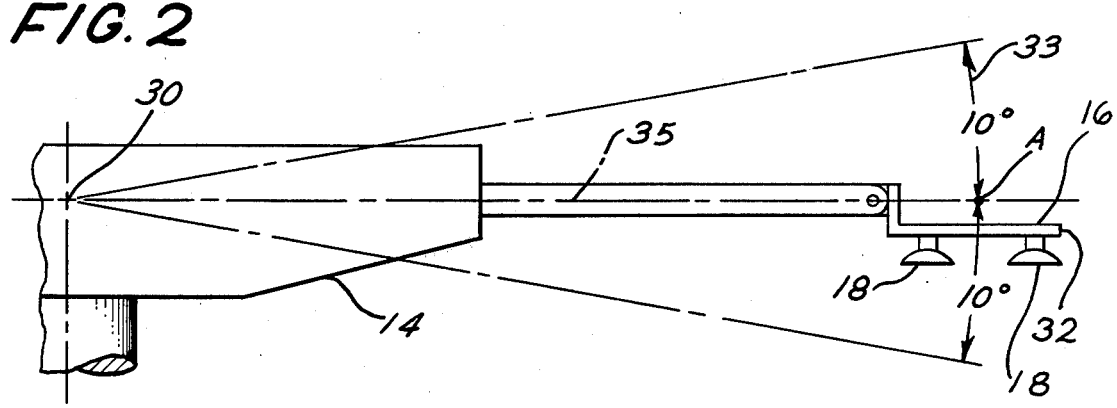
FIG. 2 is a side elevational view showing the vertical movement of the work arm of the robot used in one embodiment of the present invention.
Figure 3:
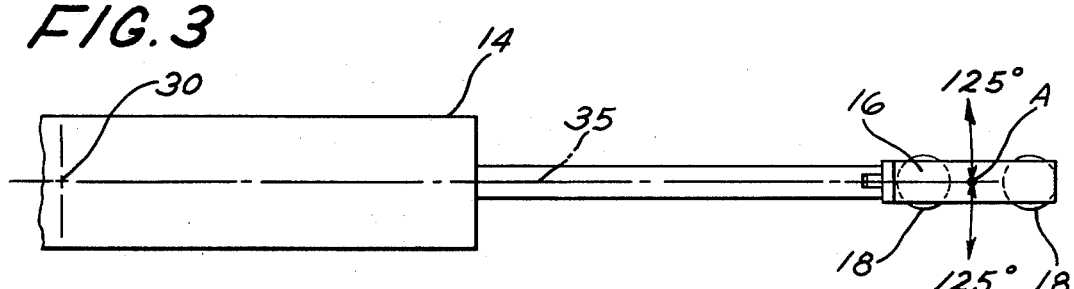
FIG. 3 is a top plan view of the work arm of the robot showing horizontal movement of the work arm utilized in one embodiment of the present invention.
Figure 4:
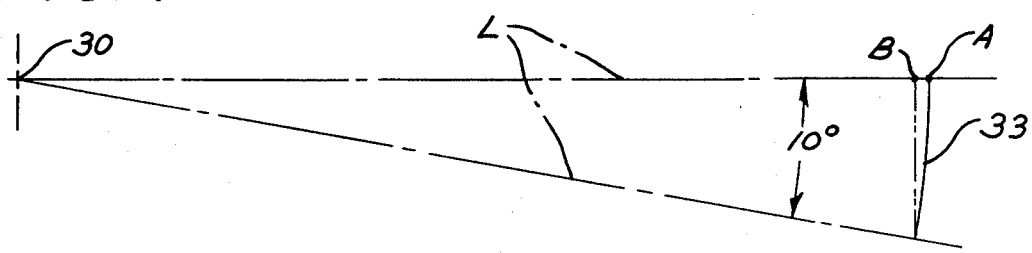
FIG. 4 is a diagramatic representation of the vertical movement of the work arm of the robot.

With particular reference to FIGS. 2-4, the robot has a work arm 14 pivoted about a point 30 and extending from the pivot point 30 to the terminal end 32 of the work piece pick-up end 16. The vertical angular movement of the work arm 14 about the pivot point 30 is ten degrees above and ten degrees below the horizontal longitudinal axis 35 of the work arm as shown in FIG. 2. The vertical movement of the work arm about the pivot point 30 scribes an arc 33 of twenty degrees.

With reference to FIG. 3, the work arm 14 is movable about the pivot point 30 laterally 125° in either direction and scribes a horizontal arc relative to the pivot point 30. Thus, the work arm 14 is movable vertically through 20° and scribes a vertical arc 33 and movable horizontally 250° and scribes a horizontal arc. The integrated movement of the work arm will thus be movable through a segment of a sphere and the robot work arm may be used to pick up deliver items or work pieces within the sphere segment. The robot is relatively low cost, primarily because it does not do any sensing and computing to make its movements but rather the movements are programmed so that the work arm moves in certain directions and at certain times depending upon signals received from the control console. Thus, if there are any obstacles in the way of the moving work arm 14, they will be encountered and the robot does not have means for sensing descrepancies in the sequence or dimensions of delivery of items from one station to another. The dimensions of the robot including its work arm varies from one model to the next, however, the Prab Conveyors, Inc. Model 4200 is representative of the type of robot useful in this invention.

Figure 5:
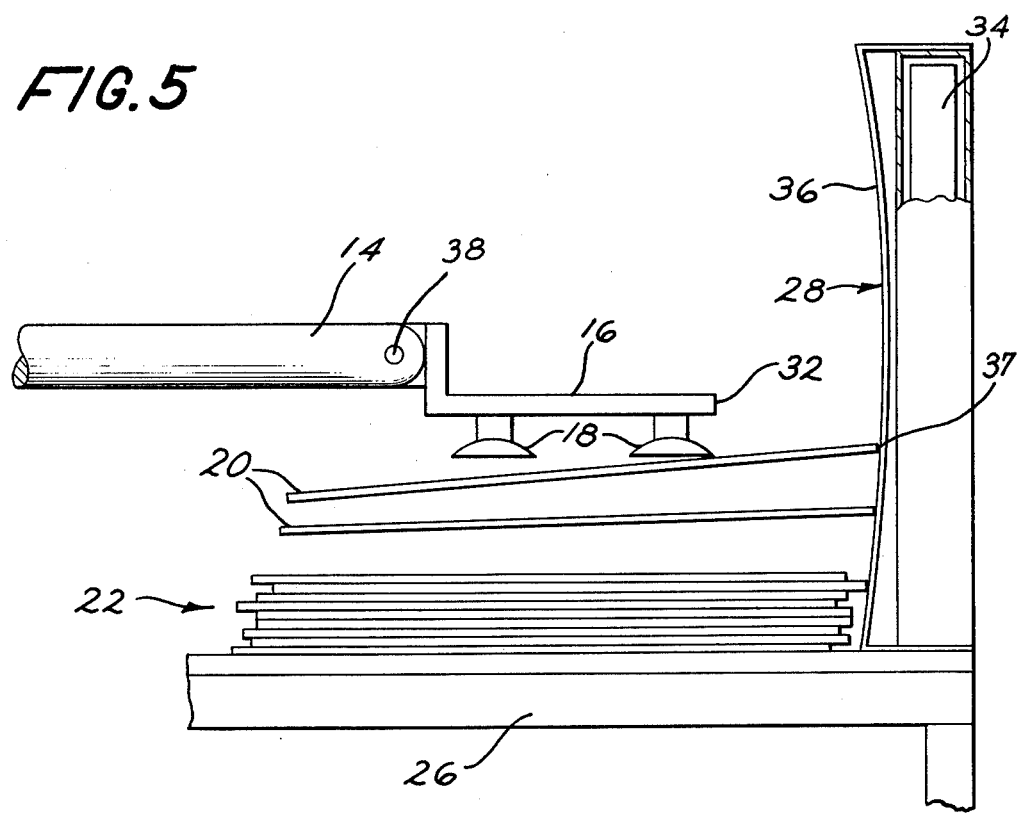
FIG. 5 is a side elevational view showing a portion of the automatic feeding apparatus in one embodiment of the present invention during the first part of the pick-up operation.
Figure 6:
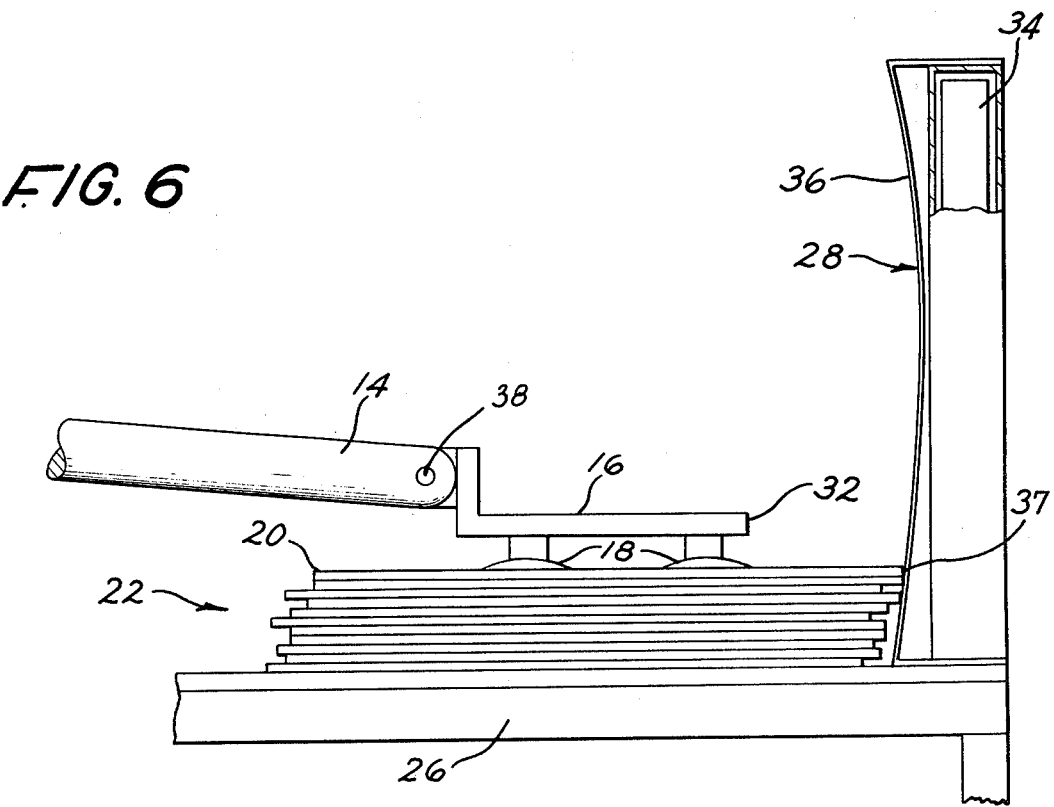
FIG. 6 is similar to FIG. 5 showing the latter part of the pick-up operation.

With regard to FIG. 4, the diagrammatic illustration represents the problem encountered with a robot used for unstacking work pieces one-by-one and placing the work piece in the exact same position in the work station or press. Namely, the length of the work arm from the pivot point 30 to the pick-up point, designated A, on the end of the arm on the horizontal axis is s fixed distance L. As shown in FIG. 4, L would extend from pivot point 30 to point A, however, when the work arm pivots 10° below the horizontal axis of the work arm and point A scribes an arc 33, it will be noted that point A moves inwardly a distance equal to the difference between point A and point B relative to the horizontal. When a robot and fixed length work arm is utilized to unstack work pieces 20 one-by-one from a stack 22 of work pieces 20, which stack may be of considerable height, the pick-up point A relative to the work piece could vary from the top of the stack down to the horizontal axis of the work arm 14 and from the horizontal axis of the work arm 14 down to the bottom of the stack. Typically, the robot work arm may be 50 to 100 inches long from its pivot point 30 to the pick-up point A. For instance, in one installation, the work arm lengh L is 57 inches and if the stack of work pieces is in alignment from the bottom of the stack to the middle or from the middle of the stack to the top, the pick-up location of the work piece will vary as much as ⅝ths of an inch. This is particularly troublesome when the robot is picking up work pieces to be delivered to a press and those work pieces must be delivered to the press in exactly the same location regardless of from where in the stack the particular work piece was obtained from by the robot work arm. With reference to FIGS. 5 and 6, there is shown a work piece stacking assembly 24 which is designed to assure that the robot work arm 14 will pick up the work pieces 20 from a stack of work pieces at exactly pick-up point A for each work piece regardless of where it is in the vertical stack.

The base 26 has located above it a butt place 28 which is curved correspondingly to the arc 33 scribed by the vertical movement of the work arm 14 of the robot. In the preferred embodiment, the butt plate is made of stainless steel and has located behind it magent means 34 which are operable to magnetize the work pieces 20 stacked upon the base 26 and the magnetic forces pass through the vertical curved butt plate 28 to set up a repelling force between the work pieces to vertically separate the work pieces in the upper portion of the stack 22 and at the same time urge the separated or levitated work pieces 20 against the front face 36 of the vertical curved butt plate 28. In the preferred embodiment, the magnet means 34 are permanent magnets that are the type manufactured and marketed by Bunting Magnetics Co. and are effective to induce a magnetic field within the magnetizable work pieces 20 so that they will be levitated or separated one from the other at the top of the stack 22. FIG. 5 shows the levitated work pieces with the work arm 14 of the robot first coming into contact with the top work piece 20 of the stack 22. The downward vertical movement of the work arm 14 against the work piece 20 and the work pieces underneath it tend to force the work pieces down upon each other until the force of the downward movement of the work arm 14 overcomes the magnetic levitating force of the magnet means 34 and results in a work piece 20 pick-up condition as represented in FIG. 6. At this stage, the robot, by vacuum or other suitable pick-up means will grip and hold the uppermost work piece 20 as by vacuum suction cups 18 and with upward vertical movement of the work arm 14, the top work piece 20 is again separated from the rest of the stack 22. It will be noted in FIGS. 5 and 6 that the top two work pieces 20 abut the front face 36 of the butt plate 28 so that during the work piece pick-up operation, the forward edge 37 of the work piece 20 is always on an arc namely the front face 36 of the butt plate 28 corresponding to the arc 33 scribed by the vertical movement of the work arm 14 of point A. In this manner, the uppermost work piece is always in the same position relative to the pivot point of the work arm of the robot. As the work pieces 20 are removed one-by-one from the stack 22 by the robot work arm, the operation continues as described above. It will be obvious that the stack 22 of work pieces 20 can be as high as the 20° vertical axis sweep of the work arm 14 or any height less than that. It will also be noted that the work arm 14 has the work piece pick-up end 16 pivoted about a point 38 so that the vacuum suction cups 18 will always pick up the work piece 20 in a horizontal plane even though the longitudinal axis of the work arm 14 may not be in a horizontal plane. This is most clearly shown in FIG. 5 and at the final position of the work arm 14 for pick-up of the work piece as shown in FIG. 6.

With reference to FIGS. 7 and 8, two typical automatic feeding apparatus arrangements are shown for transferring magnetizable work pieces from a stack 22 of work pieces 20 to a work station 40 which, in this case, is a press. As seen in FIG. 7, the work piece stacking assembly 24, having a base 26, has stacked on top of the base a number or work pieces 20 to comprise a stack 22. These work pieces 20 are rectangular in shape and the work arm 14 of the robot is perpendicular to one side of the work piece, namely the forward side or edge 37 away from the work arm 14, during pick-up of the work piece. The vertical butt plate 28 and the magnet means behind it are located so that the edge 37 of the work piece 20 perpendicular to the robot work arm will abut the front face 36 of the butt plate 28. To assist in correctly stacking the work pieces, there also may be locator bars 42 mounted on the base 26 so the side or edge 41 of the work piece 20 of the stack 22 adjacent the edge 37 of the work pieces 20 abutting the vertical butt plate 28 will also be correctly aligned for pick-up of each work piece 20 by the work arm 14. Upon completion of the pick-up of the top work piece 20 from the stack 22, the robot work arm 14 rotates horizontally 90° to where the press 40 is located and deposits the work piece 20 in the press against the locator pins 44 and releases the vacuum suction cups 18 from the work piece and withdraws the work arm from within the press whereupon the press, through appropriate control means, operates to perform its designed function on the work piece.

It is usually desirable that once the work arm 14 picked-up the work piece 20 from the stack 22 that the arm be retracted a short distance during its rotational arcuate movement from the work piece stacking assembly 24 to the work station 40 and when the work arm is correctly oriented with respect to the work station, the work arm is extended that short distance to deposit the work piece 20 in the dies of the press against the locator pins 44. FIG. 8 operates generally in the same manner as described in connection with FIG. 7, however, in this automatic feeding apparatus arrangement, the robot work arm 14 rotates from the work piece stacking assembly 24 to the work station 40 through a 45° horizontal angle rather than a 90° angle. It will be noted that to effect this shorter rotational arcuate movement of the work arm, the rectangular work piece is picked-up on a diagonal relative to the sides of the work piece 20. That is, the longitudinal axis of the robot work arm 14 bisects the angle formed by the adjoining sides 37 and 41 of the rectangular work piece away from the robot work arm during the pick-up operation and also during the delivery operation of the work piece at the work station 40. It is therefore desirable to have butt plates 28 and the magnet means 34 therebehind located on each adjoining side 37 and 41 of the rectangular work piece away from the work piece pick-up end 16 of the robot work arm 14 so that the vertical arcuate movement of the work arm is accommodated in the same manner as described above.

The foregoing is a description of the preferred embodiment of the automatic feeding apparatus of the invention and it should be understood that variations may be made thereto without departing from the true spirit of the invention as defined in the appended claims.

What is claimed is:

1. Automatic feeding apparatus for transferring magnetizable work pieces to a work station comprising:
   a robot having a work arm pivoted about a point and having a work piece pick-up end movable through a segment of a sphere with vertical movement of the work arm about the pivot point scribing an arc, said work arm having means to pick up, hold and release a work piece;
   a work piece stacking assembly including:
     a base for holding a vertical stack of magnetizable work pieces;
     a vertical butt plate above the base curved correspondingly to the arc scribed by the vertical movement of the work arm;
     magnet means operable to magnetize the work pieces through the vertical curved butt plate to set up a repelling force between the work pieces to vertically separate the work pieces in the upper portion of the stack and urge the separated work pieces against the vertical curved butt plate, and
   a work station for receiving the work piece located within the sphere segment through which the work piece pick-up arm end of the robot is movable.

2. The automatic feeding apparatus of claim 1 wherein the work piece is rectangular shaped and the robot work arm is perpendicular to the side of the work piece away from the work arm during pick-up of the work piece.

3. The automatic feeding apparatus of claim 1 wherein the work piece is rectangular and there are two vertical curved butt plates above the base, one for each adjoining side of the work piece away from the workpiece pick-up end of the robot work arm, and magnet means for each of the vertical curved butt plates.

4. The automatic feeding apparatus of claim 3 wherein the longitudinal axis of the robot work arm bisects the angle formed by the adjoining sides of the rectangular work piece away from the robot work arm during the pick-up operation.

5. The automatic feeding apparatus of claim 1 wherein a portion of the work arm is retractable and extendable and it is extended during pick-up of the work piece from the stack and when the work piece is received by the work station.

6. The automatic feeding apparatus of claim 5 wherein the work station has workpiece locator pins against which the workpiece is urged when the portion of the work arm is extended and the workpiece released from the work arm.

* * * * *